United States Patent
Liu

(10) Patent No.: US 12,243,868 B2
(45) Date of Patent: *Mar. 4, 2025

(54) POWER SWITCH FOR BACKSIDE POWER DISTRIBUTION

(71) Applicant: Taiwan Semiconductor Manufacturing Company, Ltd., Hsinchu (TW)

(72) Inventor: Jack Liu, Taipei (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,199

(22) Filed: Jan. 11, 2024

(65) Prior Publication Data

US 2024/0153939 A1    May 9, 2024

Related U.S. Application Data

(60) Continuation of application No. 17/871,005, filed on Jul. 22, 2022, now Pat. No. 11,887,978, which is a
(Continued)

(51) Int. Cl.
*H01L 29/417*    (2006.01)
*G06F 30/392*    (2020.01)
(Continued)

(52) U.S. Cl.
CPC ........ *H01L 27/0207* (2013.01); *G06F 30/392* (2020.01); *H01L 21/823475* (2013.01);
(Continued)

(58) Field of Classification Search
CPC ....... H01L 2027/11881; H01L 23/5286; H01L 27/0207; H01L 21/823475; H01L 23/481
See application file for complete search history.

(56) References Cited

U.S. PATENT DOCUMENTS 7,928,567 B2    4/2011    Van De Weil et al.
8,169,081 B1    5/2012    Jergovic et al.
(Continued)

OTHER PUBLICATIONS

Final Office Action on U.S. Appl. No. 16/877,256 DTD Dec. 28, 2022.
(Continued)

*Primary Examiner* — Kyoung Lee
*Assistant Examiner* — David J Goodwin
(74) *Attorney, Agent, or Firm* — FOLEY & LARDNER LLP

(57) ABSTRACT

Disclosed embodiments herein relate to an integrated circuit including power switches with active regions connected to form a contiguous region. In one aspect, the integrated circuit includes a first layer including a first metal rail extending in a first direction. In one aspect, the integrated circuit includes a second layer above the first layer along a second direction perpendicular to the first direction. The second layer may include active regions for power switches. In one aspect, the active regions of the power switches are connected to form a contiguous region extending in the first direction. The first metal rail may be electrically coupled to the active regions through via contacts. In one aspect, the integrated circuit includes a third layer above the second layer along the second direction. The third layer may include a second metal rail electrically coupled to some of the power switches through additional via contacts.

20 Claims, 9 Drawing Sheets

Related U.S. Application Data division of application No. 16/877,256, filed on May 18, 2020, now Pat. No. 11,749,670.

(51) Int. Cl.
*H01L 21/8234* (2006.01)
*H01L 23/528* (2006.01)
*H01L 27/02* (2006.01)
*H01L 29/20* (2006.01)
*G06F 30/31* (2020.01)
*G06F 117/12* (2020.01)

(52) U.S. Cl.
CPC .......... *H01L 23/5286* (2013.01); *G06F 30/31* (2020.01); *G06F 2117/12* (2020.01)

(56) References Cited

U.S. PATENT DOCUMENTS 11,887,978 B2 * 1/2024 Liu ................. H01L 21/823475
2005/0017299 A1 1/2005 Shen
2012/0313147 A1 12/2012 Anderson et al.
2019/0198627 A1 6/2019 Then et al.
2020/0075726 A1 3/2020 Liao et al.
2022/0069076 A1 3/2022 Yu et al.

OTHER PUBLICATIONS

Non-Final Office Action on U.S. Appl. No. 16/877,256 DTD Jul. 5, 2022.
Notice of Allowance on U.S. Appl. No. 16/877,256 DTD Apr. 17, 2023.
Notice of Allowance on U.S. Appl. No. 17/871,005 DTD Sep. 27, 2023.
Restriction Requirement issued in connection with U.S. Appl. No. 16/877,256 dated Feb. 11, 2022.

* cited by examiner

US 12,243,868 B2

POWER SWITCH FOR BACKSIDE POWER DISTRIBUTION

CROSS-REFERENCE TO RELATED APPLICATION

This application is a continuation application of U.S. patent application Ser. No. 17/871,005, which is a divisional application of U.S. Pat. No. 11,749,670, each of which is incorporated herein by reference in its entirety for all purposes.

BACKGROUND

The recent trend in miniaturizing integrated circuits (ICs) has resulted in smaller devices which consume less power yet provide more functionality at higher speeds. The miniaturization process has also resulted in stricter design and manufacturing specifications as well as reliability challenges. Various electronic design automation (EDA) tools generate, optimize and verify standard cell layout patterns for integrated circuits while ensuring that the standard cell layout designs and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
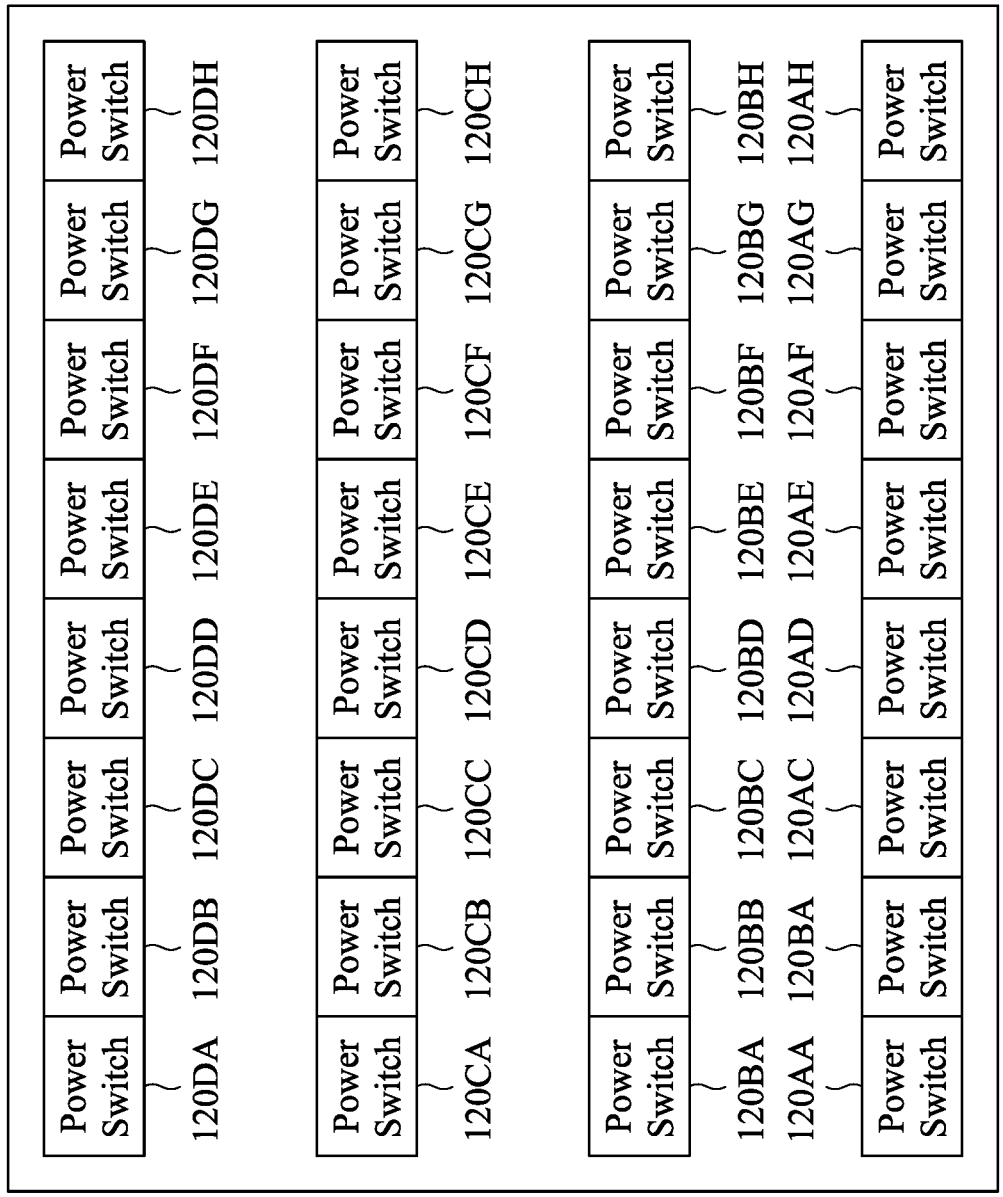
FIG. 1 is a top plan view of a layout design of an integrated circuit including power switches with active regions connected in a direction, in accordance with one embodiment.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, disclosed herein is related to an integrated circuit including power switches with active regions that are connected to form a contiguous region. The active regions may have either n-type or p-type doping. Within the active regions of the power switches, source regions or drain regions of transistors can be formed to receive power (e.g., supply voltage or current) from backside metal rails and to provide regulated power (e.g., regulated voltage or current) to other circuits within the integrated circuit. Backside metal rails may be metal rails formed or disposed below the active regions of the power switches for providing power to the power switches, where front side metal rails may be metal rails formed or disposed above the active regions of the power switches for providing regulated power or other electrical signals. In one aspect, the active regions of the power switches are connected to form a contiguous region extending in a first direction (e.g., X-direction).

In some embodiments, the integrated circuit includes a layer having a first backside metal rail and a second backside metal rail separated by a distance along the first direction (e.g., X-direction). The first backside metal rail may be electrically coupled to one or more of the active regions through one or more via contacts, where the second backside metal rail may be electrically coupled to a separate active region through one or more via contacts. In some embodiments, a length of the contiguous region of the active regions along the first direction (e.g., X-direction) is at least four times the distance. In some embodiments, the length of the contiguous region of the active regions for the power switches is at least 1.1×M×N and less than or equal to 1.4×M×N, where the M is a number of power switches of the set of power switches and the N is larger than four times the distance.

Advantageously, the power switches with the active regions forming a contiguous region can improve flexibility in routing and achieve power efficiency. In one aspect, the power switches aligned in the first direction improves flexibility in routing, compared to power switches that are not aligned. In one aspect, active regions connected to form a contiguous region allow a backside metal rail below the active regions to have a larger area and allow more number of via contacts for the backside metal rail. Hence, resistances for providing a supply voltage through backside metal rails can be reduced to improve power efficiency.

FIG. 1 is a top plan view of a layout design 100 of an integrated circuit including power switches 120AA-120AH, 120BA-BH, 120CA-CH, 120DA-120DH with active regions connected in a direction (e.g., X-direction), in accordance with one embodiment. The layout design 100 includes layout patterns indicating or describing locations and/or configurations of various components of the integrated circuit. According to the layout design 100, the integrated circuit can be formed. The power switches 120 may receive power (e.g., supply voltage or current), and provide regulated power (e.g., regulated voltage or current) to other circuits (not shown in FIG. 1) within the integrated circuit formed according to the layout design 100. In some embodiments, the layout design 100 includes more, fewer, or different layout patterns than shown in FIG. 1.

In one configuration, a set of power switches 120AA-120AH is disposed along a X-direction. In one configuration, above the set of power switches 120AA-120AH along a Y-direction, a set of power switches 120BA-120BH is disposed along the X-direction. In one configuration, above the set of power switches 120BA-120BH along the Y-direction, a set of power switches 120CA-120CH is disposed along the X-direction. In one configuration, above the set of power switches 120CA-120CH along the Y-direction, a set of power switches 120DA-120DH is disposed along the X-direction. In one aspect, each power switch 120 includes an active region extending in the X-direction, such that an active region of a power switch 120 can abut or adjoin an active region of its adjacent power switch 120. For example, active regions of the power switches 120AA-120AH can form a contiguous region elongated along the X-direction.

Advantageously, active regions of the power switches 120 forming a contiguous region can improve flexibility in routing and achieve power efficiency. In one aspect, the power switches 120 aligned in the X-direction improves flexibility in routing, compared to power switches that are not aligned. In one aspect, active regions connected to form a contiguous region allow a larger area for a backside metal rail that supplies power (e.g., supply voltage or current), and allow more number of via contacts between the active regions and the backside metal rail. Hence, resistances of the backside metal rail and the via contacts can be reduced to improve power efficiency.

In one aspect, layout patterns of each power switch 120 are placed as a standard cell. A cell is a group of layout patterns that can be replicated and placed in different areas within the layout design. For example, layout patterns for the power switch 120AA can be replicated and placed for other power switches 120AB-120AH, 120BA-120BH, 120CA-120CH, 120DA-120DH within the layout design 100 for the integrated circuit. The use of a standard cell can help a circuit designer to place same components in the same configuration in a prompt manner. In one aspect, a cell of the power switch 120 includes at least a first layout pattern corresponding to an active region and a second layout pattern corresponding to a backside metal rail below the active region. The first layout pattern corresponding to the active region and the second layout pattern corresponding to the backside metal rail may extend in the X-direction, where ends of the first layout pattern and the second layout pattern are aligned with two sides or ends (e.g., left end and right end) of the cell. Hence, if two cells of the power switches 120 are placed adjacent to each other along the X-direction, an end of a layout pattern for an active region for a first cell and an end of a layout pattern for an active region for a second cell can abut with each other. Similarly, if two cells of the power switches 120 are placed adjacent to each other along the X-direction, an end of a layout pattern for a backside metal rail for a first cell and an end of a layout pattern for a backside metal rail for a second cell can abut with each other. Hence, placing cells for power switches 120 along the X-direction with a right end of each cell adjoined with a left end of its subsequent cell allows layout patterns for active regions and backside metal rails to form contiguous regions extending in the X-direction.

Figure 2:
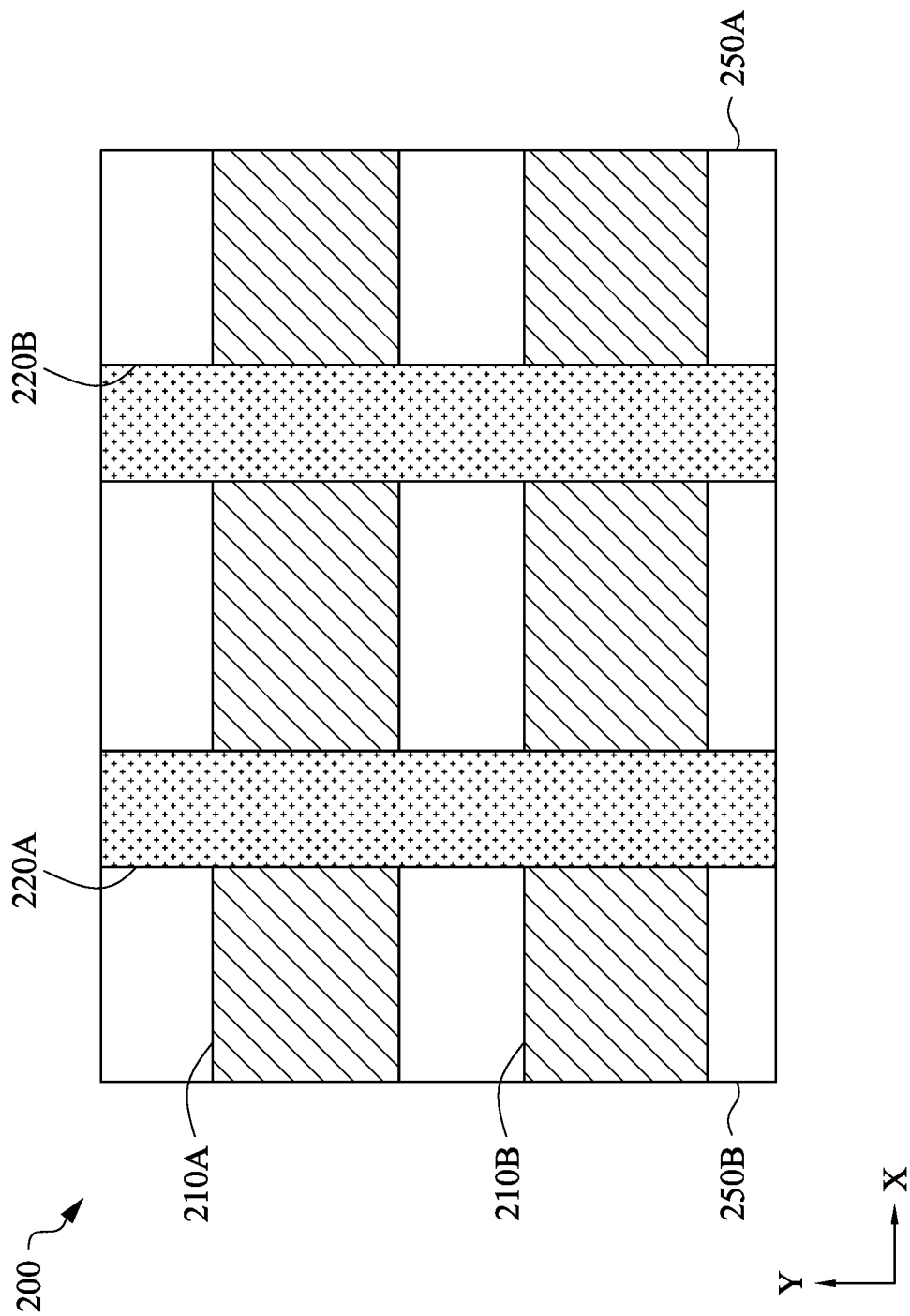
FIG. 2 is a top plan view of a layout design of a power switch, in accordance with one embodiment.

Referring to FIG. 2, illustrated is a top plan view of a cell 200 of a power switch 120, in accordance with one embodiment. In some embodiments, the cell 200 of the power switch 120 includes layout patterns 210A, 210B corresponding to active regions and layout patterns 220A, 220B corresponding to gate regions. The active regions may be doped with n-type doping materials or p-type doping materials. The gate region may have conductive material (e.g., polysilicon or any metal). In some embodiments, the cell 200 of the power switch 120 includes more, fewer, or different layout patterns than shown in FIG. 2.

In one configuration, the layout patterns 210A, 210B for the active regions extend in the X-direction, where the layout patterns 220A, 220B for the gate regions extend in the Y-direction. In one aspect, one or more transistors can be formed at intersections of the layout patterns 210A, 210B, and the layout patterns 220A, 220B. In some embodiments, right ends of the layout patterns 210A, 210B are aligned with a right end 250A of the cell 200 and left ends of the layout patterns 210A, 210B are aligned with a left end 250B of the cell 200. Hence, placing two cells 200 for power switches 120 along the X-direction with the right end 250A of a first cell 200 adjoined with the left end 250B of a second cell 200 allows layout patterns 210A, 210B for active regions to form contiguous regions extending in the X-direction.

Figure 3:
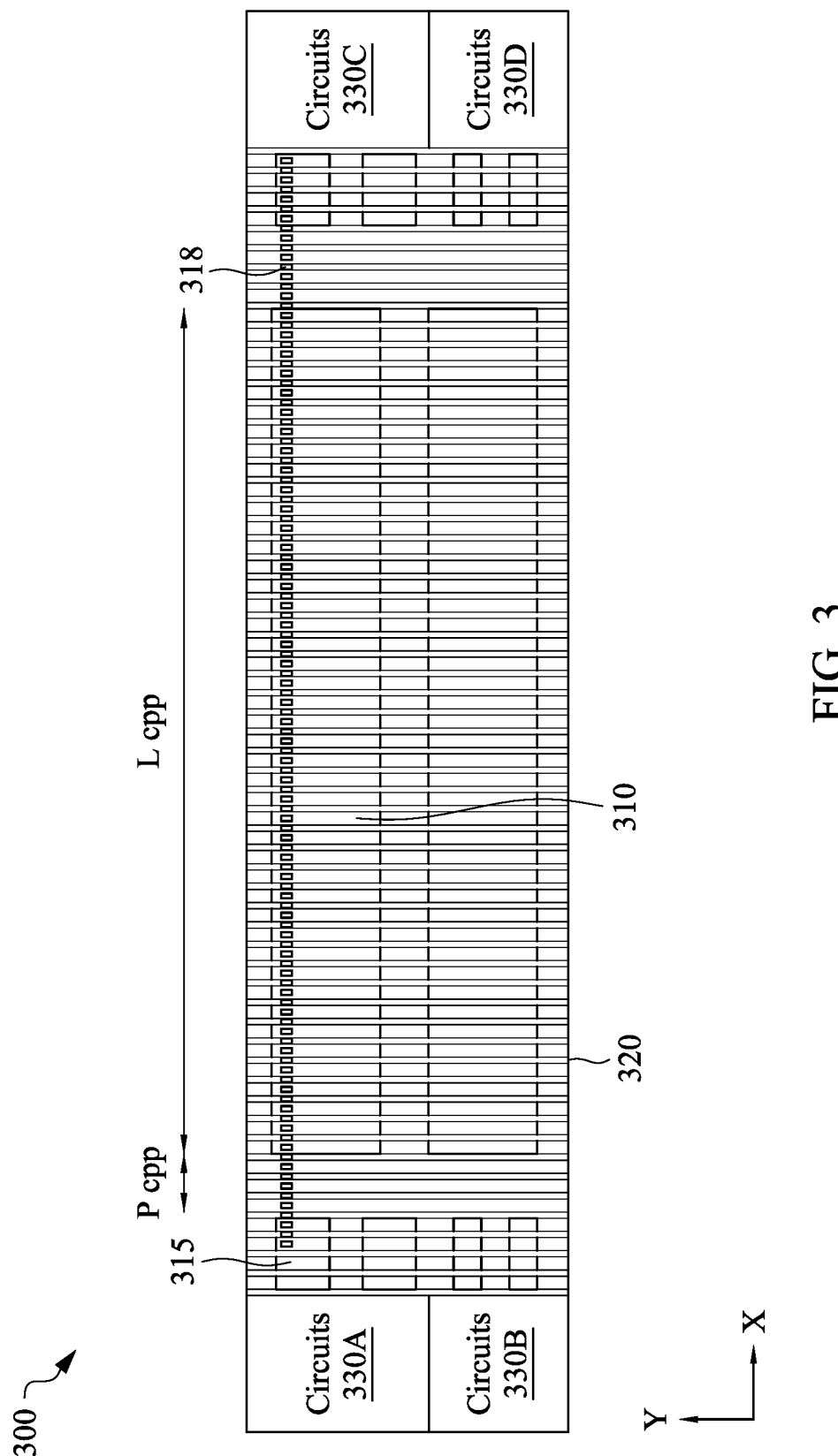
FIG. 3 is a top plan view of a layout design of an integrated circuit including power switches with active regions connected in a direction, in accordance with one embodiment.

FIG. 3 is a top plan view of a layout design 300 of an integrated circuit including power switches with active regions connected in a direction, in accordance with one embodiment. The integrated circuit formed according to the layout design 300 may be part of the integrated circuit of FIG. 1. In some embodiments, the layout design 300 includes layout patterns 310, 315 corresponding to active regions, layout patterns 320 corresponding to gate regions, and layout patterns 330A-330D corresponding to various circuits. As described above with respect to FIGS. 1 and 2, the layout patterns 310, 315 corresponding to the active regions may extend in the X-direction, and the layout patterns 320 corresponding to the gate regions may extend in the Y-direction. In one aspect, power switches formed according to the layout patterns 310, 320 can receive power (e.g., supply voltage or current) through a backside metal rail underneath the active regions, and provide regulated power (e.g., regulated voltage or current) to the circuits 330A, 330B, 330C, 330D. In some embodiments, the layout design 300 includes more, fewer, or different layout patterns than shown in FIG. 3.

In one aspect, the layout pattern 310 corresponding to an active region of power switches have a length L cpp along the X-direction, where the layout patterns for backside metal rails underneath the active regions formed according to the layout patterns 310, 315 are separated by a distance P cpp along the X-direction. One cpp may be a channel poly pitch corresponding to a minimum pitch between two gate regions. In some embodiments, the length of the contiguous region of the active regions for the set of power switches is at least 1.1×M×N and less than or equal to 1.4×M×N, where the M is a number of power switches (or power switch cells) and the N>4×P. In one aspect, if L is less than 1.1×M×N, then the advantages such as reduced resistances of the backside metal rails and via contacts may not be achieved. If L is larger than 1.4×M×N, then performance of the power switches may degrade. For example, if L is larger than 1.4×M×N, then the power switches may cause large peak currents.

Figure 4:
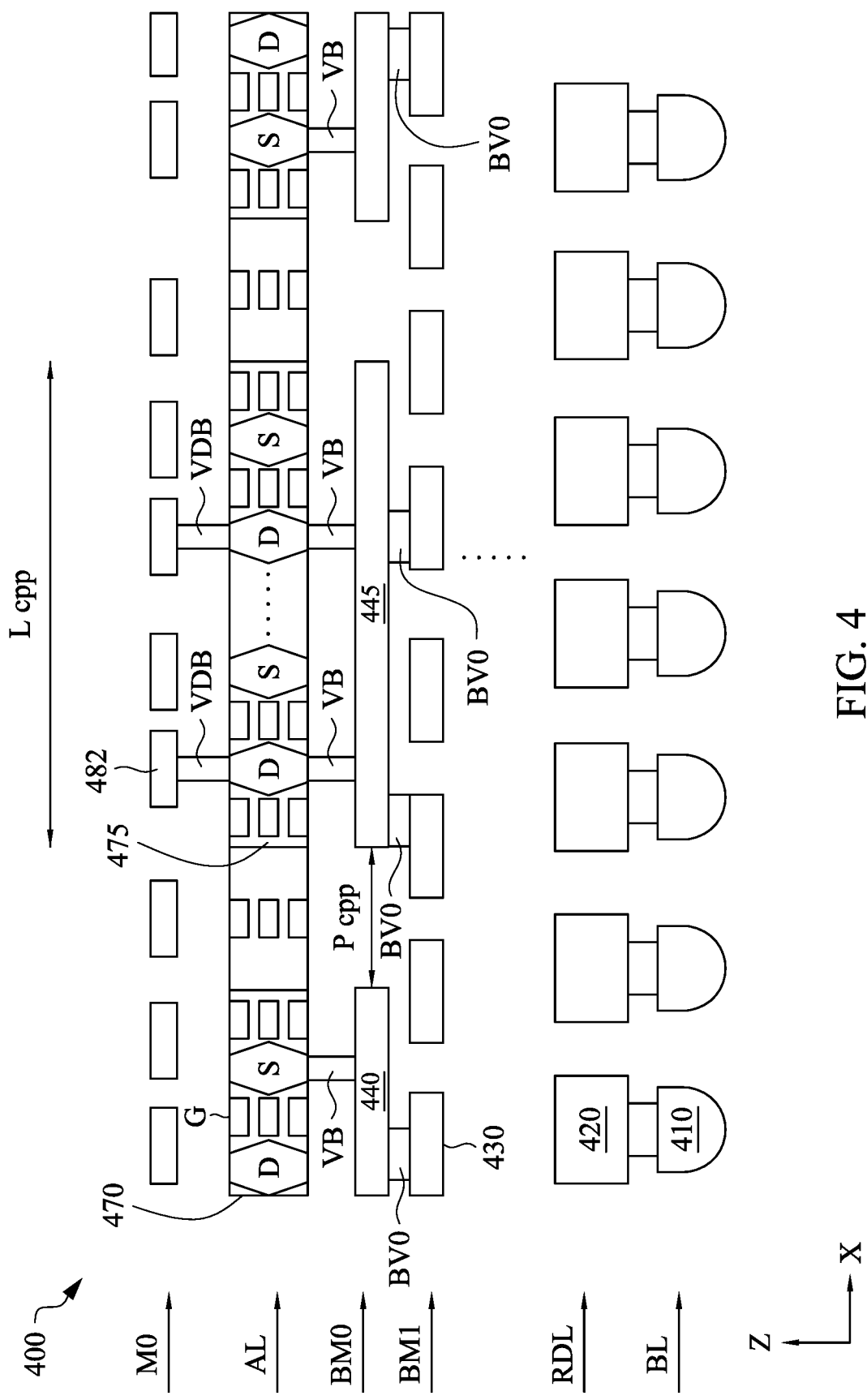
FIG. 4 is a cross section of an integrated circuit formed according to the layout design shown in FIG. 3, in accordance with one embodiment.

FIG. 4 is a cross section of an integrated circuit 400 along a line 318 in FIG. 3 formed according to the layout design 300, in accordance with one embodiment. In some embodiments, the integrated circuit 400 formed according to the layout design 300 includes a bump layer BL, a redistribution layer RDL, a backside metal layer BM1, a backside metal layer BM0, an active layer AL, and a front side metal layer M0. In some embodiments, the integrated circuit 400 includes additional layers (e.g., additional front side metal layers M1-M7) along a Z-direction orthogonal to the X-direction and the Y-direction.

In some embodiments, the bump layer BL includes solder bumps 410. The solder bumps 410 may connect to an external device to receive power (e.g., supply voltage or current) and/or an electrical signal through, for example, bonding wires. In some embodiments, the integrated circuit 400 includes the redistribution layer RDL along the Z-direction above the bump layer BL. The redistribution layer RDL may include metal contacts 420 that are electrically connected to the solder bumps.

In some embodiments, the integrated circuit 400 includes the backside metal layer BM1 above the redistribution layer RDL along the Z-direction. The backside metal layer BM1 may include backside metal rails 430 extending in the Y-direction. The backside metal rails 430 may be electrically coupled to the metal contacts 420 in the redistribution layer RDL through one or more via contacts. The integrated circuit 400 may include additional layers between the backside metal layer BM1 and the redistribution layer RDL with corresponding metal rails and via contacts to provide power (e.g., supply voltage or current).

In some embodiments, the integrated circuit 400 includes the backside metal layer BM0 above the backside metal layer BM1 along the Z-direction. The backside metal layer BM0 may include backside metal rails 440, 445 extending in the X-direction. The backside metal rails 440 may be electrically coupled to the backside metal rails 430 through one or more via contacts BV0. In some embodiments, the backside metal rails 440, 445 are separated by a distance P cpp along the X-direction.

In some embodiments, the integrated circuit 400 includes the active layer AL above the backside metal layer BM0 along the Z-direction. The active layer AL may include active regions 470, 475. In some embodiments, ends of the active regions 470, 475 are aligned with ends of backside metal rails 440, 445, such that the active regions 470, 475 are separated by the distance P cpp along the X-direction. Within the active regions 470, 475, drain regions D, source regions S, and gate regions G can be formed. The drain regions D, the source regions S, and the gate regions G may form one or more transistors. In one aspect, the drain regions D and the source regions S may have a different type of doping material than a doping material of the active regions 470, 475. The source regions S of power switches may be electrically coupled to the backside metal rails 430, 440 through via contacts VB, BV0 to receive supply voltages or electrical signals. The drain regions D of the power switches may be electrically coupled to the backside metal rail 445, and/or front side metal rails 482 in the front side metal layer M0 to provide regulated supply voltages or electrical signals.

Advantageously, the backside metal rails 430, 440, 445 allow the integrated circuit 400 to be formed in an area efficient manner. For example, without backside metal rails, widths and/or lengths of drain regions D, source regions S, and/or gate regions G may be increased to accommodate a minimum spacing for via contacts. By implementing the backside metal rails 430, 440, 445 and the front side metal rails (not shown), widths and/or lengths of drain regions D, source regions S, and/or gate regions G may have compact forms, where via contacts VB between the active regions 470, 475 and backside metal rails 440, 445 and via contacts VDB between the active regions 470, 475 and the front side metal rails 482 can still satisfy the minimum spacing.

Advantageously, the backside metal rails 430, 440, 445 can improve power efficiency. In one example, the backside metal rails 430, 440, 445 may have larger areas and more regular structures than front side metal rails 482, such that resistances of the backside metal rails 430, 440, 445 may be lower than front side metal rail 482. Moreover, the backside metal rails 430, 440, 445 having larger areas and more regular structures may allow a larger number of via contacts VB for the backside metal rails 430, 440, 445. By reducing resistances of the backside power rails 430, 440, 445 and via contacts, power loss of the backside metal rails 430, 440, 445 and via contacts can be reduced.

Figure 5:
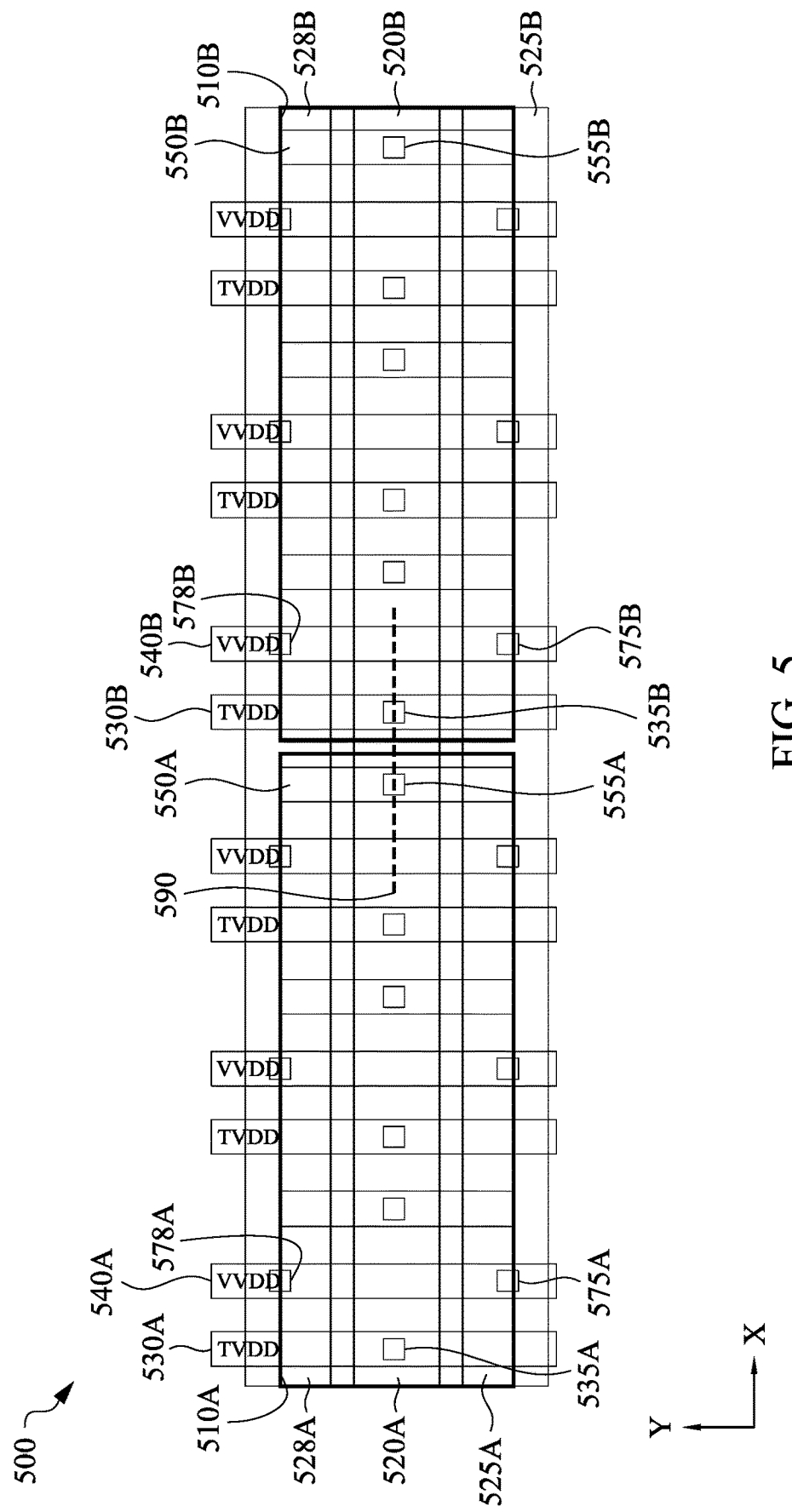
FIG. 5 is a top plan view of a portion of an integrated circuit including multiple cells with backside metal rails connected in a direction, in accordance with one embodiment.

FIG. 5 is a top plan view of a layout design 500 of an integrated circuit including multiple cells 510A, 510B with backside metal rails connected in the X-direction, in accordance with one embodiment. Each of the cells 510A, 510B may correspond to layout designs 100, 300, 500 of power switches shown in FIGS. 1-3. In one aspect, the cell 510A includes layout patterns 520A, 525A, 528A for backside metal rails in the backside metal layer BM0, and layout patterns 530A, 540A, 550A for backside metal rails in the backside metal layer BM1. The backside metal rails in the backside metal layer BM0 may extend in the X-direction, where the backside metal rails in the backside metal layer BM1 may extend in the Y-direction. Similarly, the cell 510B includes layout patterns 520B, 525B, 528B for backside metal rails in the backside metal layer BM0, and layout patterns 530B, 540B, 550B for backside metal rails in the backside metal layer BM1. The backside metal rails formed according to the layout patterns 530A, 530B, 550A, 550B can be electrically coupled to the backside metal rails formed according to the layout patterns 520A, 520B through via contacts formed according to layout patterns 535A, 535B, 555A, 555B. The backside metal rails formed according to the layout patterns 540A, 540B can be electrically coupled to the backside metal rails formed according to the layout patterns 525A, 525B, 528A, 528B through via contacts formed according to layout patterns 575A, 575B, 578A, 578B. In this configuration, backside metal rails formed according to the layout patterns 520A, 520B, 530A, 530B can provide a supply voltage TVDD, where backside metal rails formed according to layout patterns 525A, 525B, 528A, 528B, 540A, 540B can provide a regulated supply voltage VVDD.

In some embodiments, backside metal rails formed according to the cells 510A, 510B can have a contiguous region. In one aspect, left ends of the layout patterns 520A, 525A, 528A are aligned with a left end of the cell 510A, and right ends of the layout patterns 520A, 525A, 528A are aligned with a right end of the cell 510A. Hence, when the cells 510A, 510B are placed adjacent to each other along the X-direction, layout patterns for backside metal rails in the backside metal layer BM0 can form a contiguous region. For example, the layout patterns 520A, 520B can form a contiguous region, the layout patterns 525A, 525B can form a contiguous region, and the layout patterns 528A, 528B can form a contiguous region.

Advantageously, the contiguous region of backside metal rails can improve power efficiency. For example, because the backside metal rails formed according to the layout patterns 520A, 520B can form a contiguous region, via contacts between the backside metal rails in the backside metal layers BM0, BM1 can be formed according to the layout patterns 555A, 535B. If the backside metal rails formed according to the layout patterns 520A, 520B did not form a contiguous region, then via contacts formed according to the layout patterns 555A, 535B may violate a DRC and may not be placed as shown in FIG. 5. Without such via contacts, resistances between the backside metal rails in the backside metal layers BM0, BM1 may increase. By forming a contiguous region of backside metal rails, additional via contacts can be added to reduce a voltage drop across via contacts between backside metal rails in the backside metal layers BM0, BM1. For example, a voltage drop across via contacts between backside metal layers BM0 and BM1 can be reduced from 19.684 mV to 15.588 mV. Such reduction in resistances may attribute to 20% reduction in power loss through the backside metal layers and via contacts.

Figure 6:
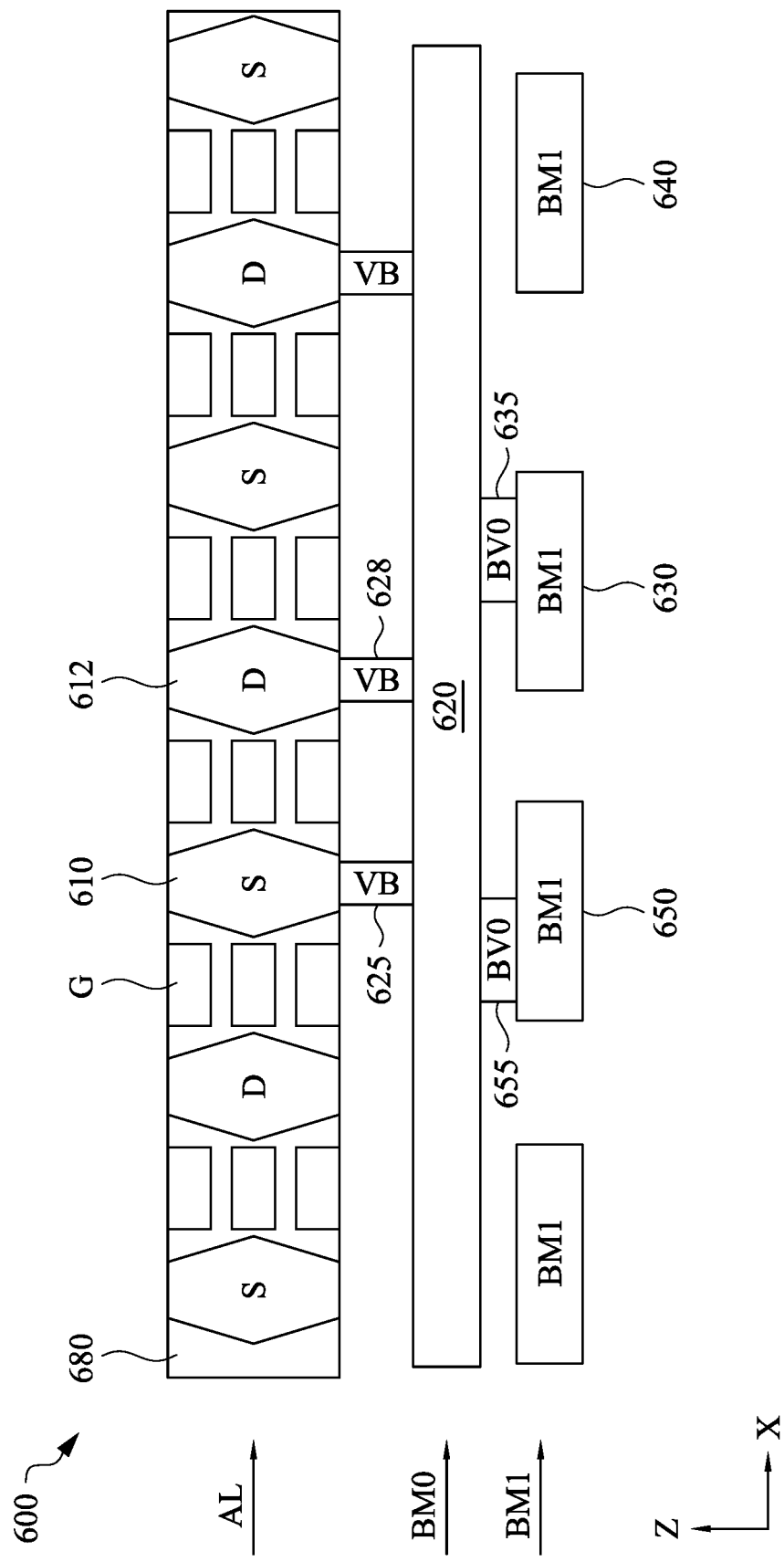
FIG. 6 is a cross section of the portion of the integrated circuit of FIG. 5, in accordance with one embodiment.

FIG. 6 is a cross section of a portion of an integrated circuit 600 formed according to the layout design 500 along a line 590 in FIG. 5, in accordance with one embodiment. In some embodiments, the integrated circuit 600 formed according to the layout design 500 includes a backside metal layer BM1, a backside metal layer BM0, and an active layer AL. The integrated circuit 600 may also include additional layers as described above with respect to FIG. 4.

In some embodiments, the integrated circuit 600 includes the backside metal layer BM1 including backside metal rails 650, 630, 640 extending in the Y-direction. The backside metal rails 650, 630, 640 may correspond to the layout patterns 550A, 530B, 540B, respectively. In one aspect, the backside metal rails 650, 630 may provide a supply voltage TVDD, where the backside metal rail 640 may provide a regulated voltage VVDD.

In some embodiments, the integrated circuit 600 includes the backside metal layer BM0 above the backside metal layer BM1 along the Z-direction. The backside metal layer BM0 may include a backside metal rail 620 extending in the X-direction. The backside metal rail 620 may correspond to the layout patterns 520A, 520B. The backside metal rail 620 may be electrically coupled to the backside metal rail 650 through a via contact BVO 655, which corresponds to the layout pattern 555A. The backside metal rail 620 may be electrically coupled to the backside metal rail 630 through a via contact BVO 635, which corresponds to the layout pattern 535B. In this configuration, the backside metal rail 620 may receive the supply voltage TVDD through the backside metal rails 650, 630.

In some embodiments, the integrated circuit 600 includes the active layer AL above the backside metal layer BM0 along the Z-direction. The active layer AL may include an active region 680. Within the active region 680, drain regions D, source regions S, and gate regions G can be formed. The drain regions D, the source regions S, and the gate regions G may form one or more transistors. In one aspect, the drain regions D and the source regions S may have a different type of doping material than a doping material of the active region 680. In one configuration, a source region S 610 and a drain region D 612 may be electrically coupled to the backside metal rail 620 through via contacts VB 625, 628, respectively, to receive supply voltages or electrical signals. Additionally, one or more source regions S and/or drain regions D may be electrically coupled to front side metal rails in the front side metal layers above the active layer AL to provide regulated supply voltages or electrical signals.

Advantageously, the contiguous region of backside metal rail 620 can improve power efficiency. For example, because the backside metal rail 620 formed according to the layout pattern 520A, 520B have a contiguous region extending along the X-direction, via contacts 655, 635 between the backside metal rails 620, 650, 630 in the backside metal layer BM0, BM1 can be formed according to the layout patterns 555A, 535B. If the backside metal rails formed according to the layout patterns 520A, 520B did not form a contiguous region, then via contacts 655, 635 formed according to the layout patterns 555A, 535B may violate a DRC and may not be placed as shown in FIG. 6. Omitting the via contacts 655, 635 may increase resistances between the backside metal rails 620, 650, 630. By forming a contiguous region of the backside metal rail 620, via contacts 625, 628 can be implemented to reduce a voltage drop across via contacts between the backside metal rails 620, 650 630.

Figure 7:
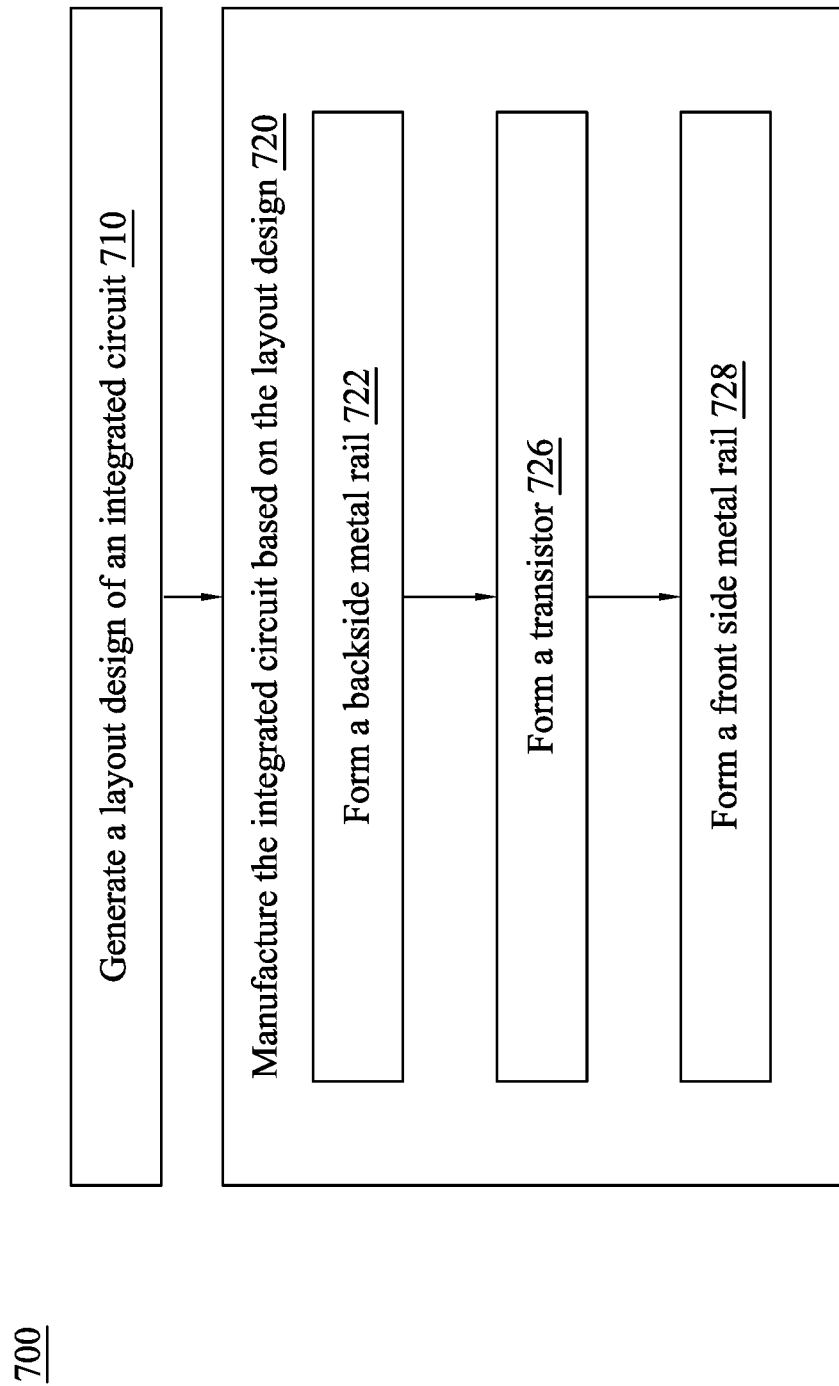
FIG. 7 is a flowchart of a method of manufacturing an integrated circuit, in accordance with some embodiments.

FIG. 7 is a flowchart of a method 700 of forming or manufacturing an integrated circuit in accordance with some embodiments. It is understood that additional operations may be performed before, during, and/or after the method 700 depicted in FIG. 7. In some embodiments, the method 700 is usable to form an integrated circuit according to various layout designs as disclosed herein.

In operation 710 of the method 700, a layout design of an integrated circuit is generated. The operation 710 is performed by a processing device configured to execute instructions for generating a layout design. In one approach, the layout design is generated by placing layout designs of one or more standard cells through a user interface. In one approach, the layout design is automatically generated by a processor executing a synthesis tool that converts a logic design (e.g., Verilog) into a corresponding layout design. In some embodiments, the layout design is rendered in a graphic database system (GDSII) file format.

In operation 720 of the method 700, the integrated circuit is manufactured based on the layout design. In some embodiments, the operation 720 of the method 700 comprises manufacturing at least one mask based on the layout design, and manufacturing the integrated circuit based on the at least one mask. In one approach, the operation 720 includes operations 722, 726, 728. In operation 722, a first layer (e.g., BM0 layer) including a first backside metal rail and a second backside metal rail is formed. The first backside metal rail and the second backside metal rail may be separated by a distance along the X-direction. In operation 726, a second layer (e.g., active layer AL) including a first set of active regions and a second set of active regions is formed above the first layer along the direction (e.g., Z-direction). The first set of active regions may form a contiguous region extending along the X-direction, and the second set of active regions may form a contiguous region extending along the X-direction. The first set of active regions and the second set of active regions may form drain regions and/or source regions of transistors for implementing power switches. The contiguous region formed by the first set of active regions and the contiguous region formed by the second set of active regions may be separated by the distance along the X-direction. In one approach, a first contact layer (e.g., VB layer) including one or more via contacts can be formed between the first layer and the second layer. In one aspect, the first set of active regions may be electrically coupled to the first backside metal rail through a via contact, and the second set of active regions may be electrically coupled to the second backside metal rail through another via contact. In operation 728, a third layer (e.g., M0 layer or any front side metal layer) including a metal rail (e.g., M0 rail or any front side metal rail) is formed above the second layer along the direction (e.g., Z-direction). In one approach, a second contact layer (e.g., VD layer) including one or more via contacts can be formed between the second layer and the third layer. The one or more via contacts in the second contact layer (e.g., VD layer) may electrically couple the first active region and/or the second active region and the front side metal rail.

In some embodiments, a length of the contiguous region of the first set of active regions along the first direction (e.g., X-direction) is at least four times the distance. In some embodiments, the length of the contiguous region of the first set of active regions is at least $1.1 \times M \times N$ and less than or equal to $1.4 \times M \times N$, where the M is a number of cells (or power switches) of the first set of active regions and the N is larger than four times the distance. In one aspect, if L is less than $1.1 \times M \times N$, then the advantages such as reduced resistances of the backside metal rails and via contacts may not be achieved. If L is larger than $1.4 \times M \times N$, then performance of the power switches may degrade. For example, if L is larger than $1.4 \times M \times N$, then the power switches may cause large peak currents.

Advantageously, the power switches with the active regions forming a contiguous region can improve flexibility in routing and achieve power efficiency. In one aspect, the power switches aligned in the first direction improves flexibility in routing, compared to power switches that are not aligned. In one aspect, active regions connected to form a contiguous region allow a backside metal rail below the active regions to have a larger area and allow more number of via contacts for the backside metal rail. Hence, resistances of providing a supply voltage through backside metal rails can be reduced to improve power efficiency.

Figure 8:
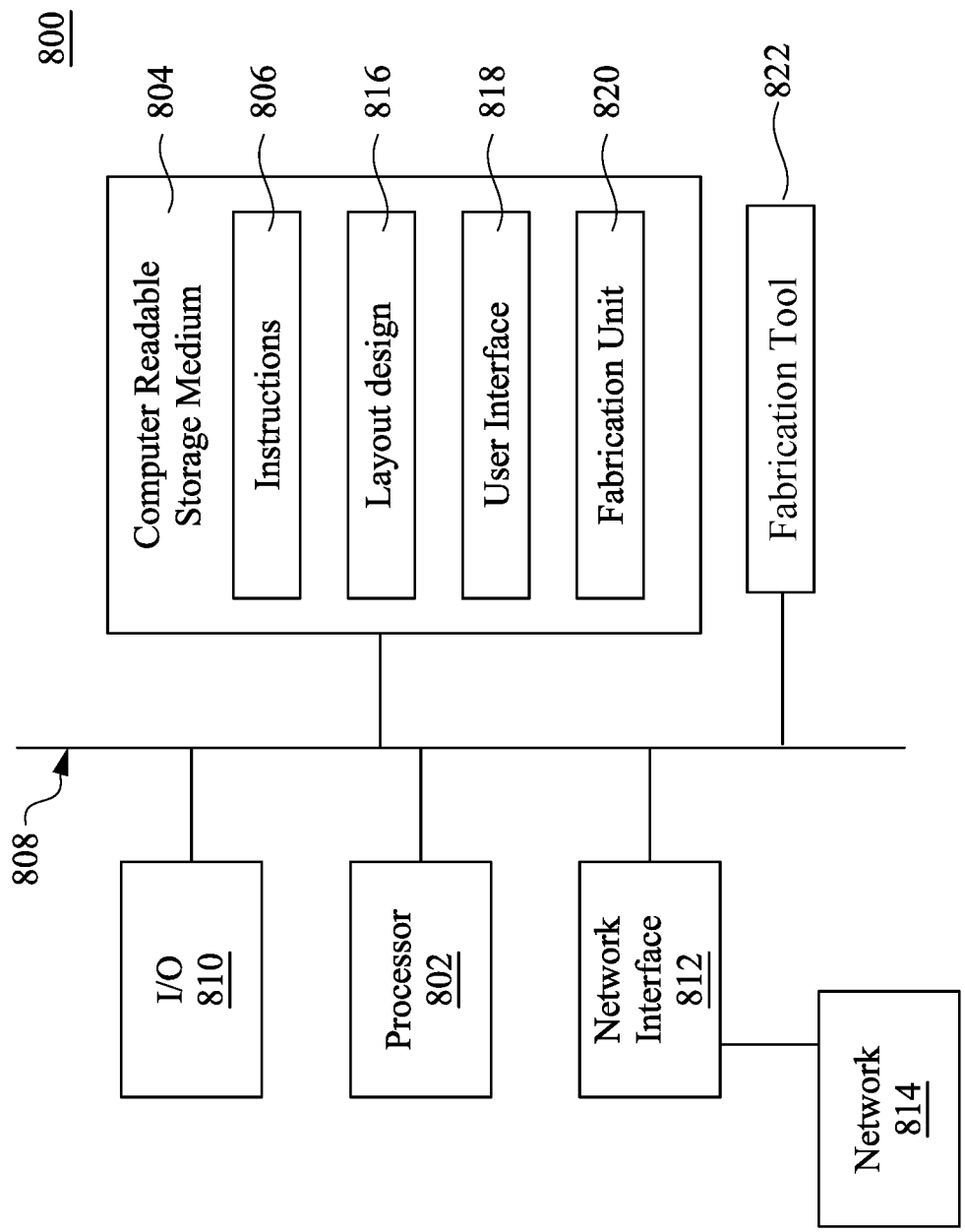
FIG. 8 is a block diagram of a system of generating an IC layout design, in accordance with some embodiments.

FIG. 8 is a schematic view of a system 800 for designing and manufacturing an IC layout design in accordance with some embodiments. In some embodiments, the system 800 generates or places one or more IC layout designs described herein. In some embodiments, the system 800 manufactures one or more ICs based on the one or more IC layout designs described herein. The system 800 includes a hardware processor 802 and a non-transitory, computer readable storage medium 804 encoded with, e.g., storing, the computer program code 806, e.g., a set of executable instructions. Computer readable storage medium 804 is configured for interfacing with manufacturing machines for producing the integrated circuit. The processor 802 is electrically coupled to the computer readable storage medium 804 by a bus 808. The processor 802 is also electrically coupled to an I/O interface 810 by the bus 808. A network interface 812 is also electrically connected to the processor 802 by the bus 808. Network interface 812 is connected to a network 814, so that processor 802 and computer readable storage medium 804 are capable of connecting to external elements via network 814. The processor 802 is configured to execute the computer program code 806 encoded in the computer readable storage medium 804 in order to cause system 800 to be usable for performing a portion or all of the operations as described in method 700.

In some embodiments, the processor 802 is a central processing unit (CPU), a multi-processor, a distributed processing system, an application specific integrated circuit (ASIC), and/or a suitable processing unit.

In some embodiments, the computer readable storage medium 804 is an electronic, magnetic, optical, electromagnetic, infrared, and/or a semiconductor system (or apparatus or device). For example, the computer readable storage medium 804 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 804 includes a compact disk-read only memory (CD-ROM), a compact disk-read/write (CD-R/W), and/or a digital video disc (DVD).

In some embodiments, the storage medium 804 stores the computer program code 806 configured to cause system 800 to perform method 700. In some embodiments, the storage medium 804 also stores information needed for performing method 700 as well as information generated during performance of method 700, such as layout design 816 and user interface 818 and fabrication unit 820, and/or a set of executable instructions to perform the operation of method 700.

In some embodiments, the storage medium 804 stores instructions (e.g., computer program code 806) for interfacing with manufacturing machines. The instructions (e.g., computer program code 806) enable processor 802 to generate manufacturing instructions readable by the manufacturing machines to effectively implement method 700 during a manufacturing process.

System 800 includes I/O interface 810. I/O interface 810 is coupled to external circuitry. In some embodiments, I/O interface 810 includes a keyboard, keypad, mouse, trackball, trackpad, and/or cursor direction keys for communicating information and commands to processor 802.

System 800 also includes network interface 812 coupled to the processor 802. Network interface 812 allows system 800 to communicate with network 814, to which one or more other computer systems are connected. Network interface 812 includes wireless network interfaces such as BLUETOOTH, WIFI, WIMAX, GPRS, or WCDMA; or wired network interface such as ETHERNET, USB, or IEEE-13154. In some embodiments, method 700 is implemented in two or more systems 800, and information such as layout design, user interface and fabrication unit are exchanged between different systems 800 by network 814.

System 800 is configured to receive information related to a layout design through I/O interface 810 or network interface 812. The information is transferred to processor 802 by bus 808 to determine a layout design for producing an IC. The layout design is then stored in computer readable medium 804 as layout design 816. System 800 is configured to receive information related to a user interface through I/O interface 810 or network interface 812. The information is stored in computer readable medium 804 as user interface 818. System 800 is configured to receive information related to a fabrication unit through I/O interface 810 or network interface 812. The information is stored in computer readable medium 804 as fabrication unit 820. In some embodiments, the fabrication unit 820 includes fabrication information utilized by system 800.

In some embodiments, the method 700 is implemented as a standalone software application for execution by a processor. In some embodiments, the method 700 is implemented as a software application that is a part of an additional software application. In some embodiments, the method 700 is implemented as a plug-in to a software application. In some embodiments, the method 700 is implemented as a software application that is a portion of an EDA tool. In some embodiments, the method 700 is implemented as a software application that is used by an EDA tool. In some embodiments, the EDA tool is used to generate a layout design of the integrated circuit device. In some embodiments, the layout design is stored on a non-transitory computer readable medium. In some embodiments, the layout design is generated using a tool such as VIRTUOSO® available from CADENCE DESIGN SYSTEMS, Inc., or another suitable layout generating tool. In some embodiments, the layout design is generated based on a netlist which is created based on the schematic design. In some embodiments, the method 700 is implemented by a manufacturing device to manufacture an integrated circuit using a set of masks manufactured based on one or more layout designs generated by the system 800. In some embodiments, system 800 is a manufacturing device (e.g., fabrication tool 822) to manufacture an integrated circuit using a set of masks manufactured based on one or more layout designs of the present disclosure. In some embodiments, system 800 of FIG. 8 generates layout designs of an IC that are smaller than other approaches. In some embodiments, system 800 of FIG. 8 generates layout designs of an IC that occupy less area than other approaches.

Figure 9:
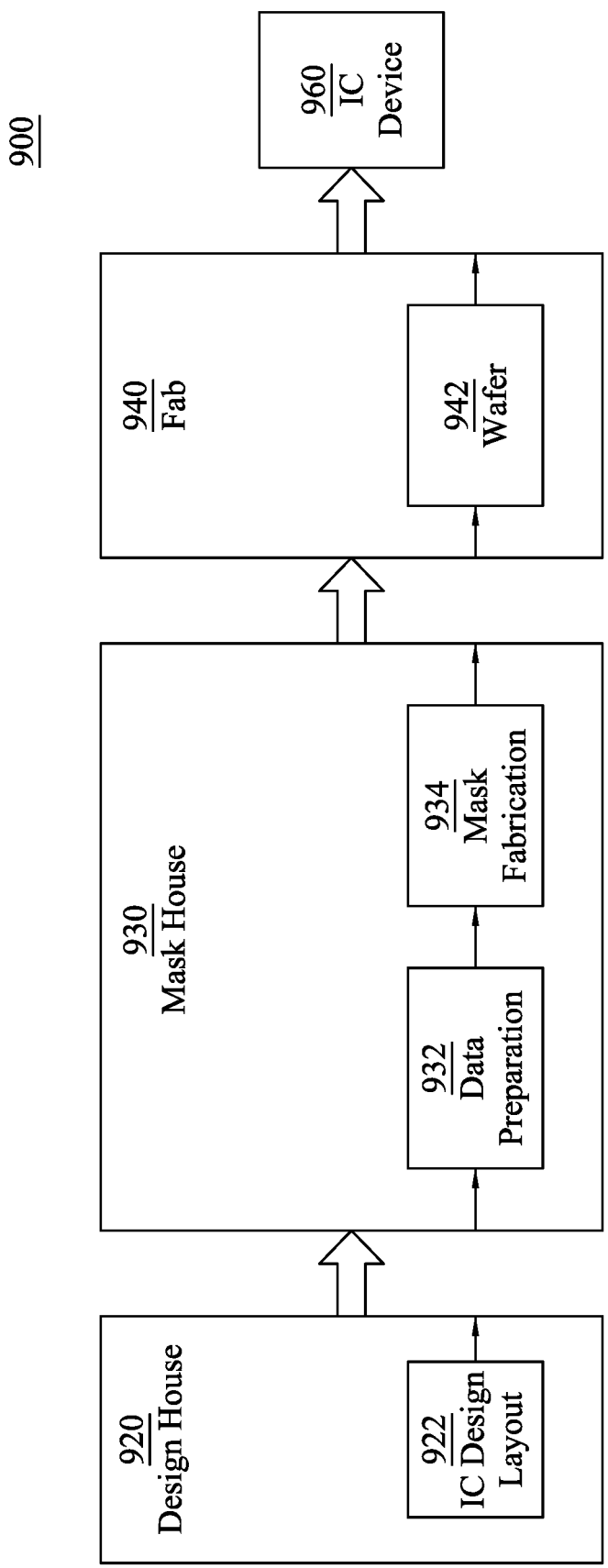
FIG. 9 is a block diagram of an IC manufacturing system, and an IC manufacturing flow associated therewith, in accordance with at least one embodiment of the present disclosure.

FIG. 9 is a block diagram of an integrated circuit (IC) manufacturing system 900, and an IC manufacturing flow associated therewith, in accordance with at least one embodiment of the present disclosure.

In FIG. 9, IC manufacturing system 900 includes entities, such as a design house 920, a mask house 930, and an IC manufacturer/fabricator ("fab") 940, that interact with one another in the design, development, and manufacturing cycles and/or services related to manufacturing an IC device 960. The entities in system 900 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 920, mask house 930, and IC fab 940 is owned by a single company. In some embodiments, two or more of design house 920, mask house 930, and IC fab 940 coexist in a common facility and use common resources.

Design house (or design team) 920 generates an IC design layout 922. IC design layout 922 includes various geometrical patterns designed for an IC device 960. The geometrical patterns correspond to patterns of metal, oxide, or semiconductor layers that make up the various components of IC device 960 to be fabricated. The various layers combine to form various IC features. For example, a portion of IC design layout 922 includes various IC features, such as an active region, gate region, source region and drain region, metal lines or via contacts of an interlayer interconnection, and openings for bonding pads, to be formed in a semiconductor substrate (such as a silicon wafer) and various material layers disposed on the semiconductor substrate. Design house 920 implements a proper design procedure to form IC design layout 922. The design procedure includes one or more of logic design, physical design or place and route. IC design layout 922 is presented in one or more data files having information of the geometrical patterns. For example, IC design layout 922 can be expressed in a GDSII file format or DFII file format.

Mask house 930 includes mask data preparation 932 and mask fabrication 934. Mask house 930 uses IC design layout 922 to manufacture one or more masks to be used for fabricating the various layers of IC device 960 according to IC design layout 922. Mask house 930 performs mask data preparation 932, where IC design layout 922 is translated into a representative data file ("RDF"). Mask data preparation 932 provides the RDF to mask fabrication 934. Mask fabrication 934 includes a mask writer. A mask writer converts the RDF to an image on a substrate, such as a mask (reticle) or a semiconductor wafer. The design layout is manipulated by mask data preparation 932 to comply with particular characteristics of the mask writer and/or requirements of IC fab 940. In FIG. 9, mask data preparation 932 and mask fabrication 934 are illustrated as separate elements. In some embodiments, mask data preparation 932 and mask fabrication 934 can be collectively referred to as mask data preparation.

In some embodiments, mask data preparation 932 includes optical proximity correction (OPC) which uses lithography enhancement techniques to compensate for image errors, such as those that can arise from diffraction, interference, other process effects and the like. OPC adjusts IC design layout 922. In some embodiments, mask data preparation 932 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 932 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during mask fabrication 934, which may undo part of the modifications performed by OPC in order to meet mask creation rules.

In some embodiments, mask data preparation 932 includes lithography process checking (LPC) that simulates processing that will be implemented by IC fab 940 to fabricate IC device 960. LPC simulates this processing based on IC design layout 922 to create a simulated manufactured device, such as IC device 960. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC can be repeated to further refine IC design layout 922.

It should be understood that the above description of mask data preparation 932 has been simplified for the purposes of clarity. In some embodiments, mask data preparation 932 includes additional features such as a logic operation (LOP) to modify the IC design layout according to manufacturing rules. Additionally, the processes applied to IC design layout 922 during mask data preparation 932 may be executed in a variety of different orders.

After mask data preparation 932 and during mask fabrication 934, a mask or a group of masks are fabricated based on the modified IC design layout. In some embodiments, an electron-beam (e-beam) or a mechanism of multiple e-beams is used to form a pattern on a mask (photomask or reticle) based on the modified IC design layout. The mask can be formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM. The mask(s) generated by mask fabrication 934 is used in a variety of processes. For example, such a mask(s) is used in an ion implantation process to form various doped regions in the semiconductor wafer, in an etching process to form various etching regions in the semiconductor wafer, and/or in other suitable processes.

IC fab 940 is an IC fabrication entity that includes one or more manufacturing facilities for the fabrication of a variety of different IC products. In some embodiments, IC fab 940 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry entity.

IC fab 940 uses the mask (or masks) fabricated by mask house 930 to fabricate IC device 960. Thus, IC fab 940 at least indirectly uses IC design layout 922 to fabricate IC device 960. In some embodiments, a semiconductor wafer 942 is fabricated by IC fab 940 using the mask (or masks) to form IC device 960. Semiconductor wafer 942 includes a silicon substrate or other proper substrate having material layers formed thereon. Semiconductor wafer further includes one or more of various doped regions, dielectric features, multilevel interconnects, and the like (formed at subsequent manufacturing steps).

System 900 is shown as having design house 920, mask house 930 or IC fab 940 as separate components or entities. However, it is understood that one or more of design house 920, mask house 930 or IC fab 940 are part of the same component or entity.

Details regarding an integrated circuit (IC) manufacturing system (e.g., system 900 of FIG. 9), and an IC manufacturing flow associated therewith are found, e.g., in U.S. Pat. No. 9,256,709, granted Feb. 9, 2016, U.S. Patent Application Publication No. 20150278429, published Oct. 1, 2015, U.S. Patent Application Publication No. 20100040838, published Feb. 6, 2014, and U.S. Pat. No. 7,260,442, granted Aug. 21, 2007, the entireties of each of which are hereby incorporated by reference.

One aspect of this description relates to an integrated circuit. In some embodiments, the integrated circuit includes a first layer including a first metal rail extending in a first direction. In some embodiments, the integrated circuit includes a second layer above the first layer along a second direction perpendicular to the first direction. In some embodiments, the second layer includes active regions for a set of power switches. In some embodiments, the active regions of the set of power switches are connected to form a contiguous region extending in the first direction. In some embodiments, the first metal rail is electrically coupled to one or more of the active regions through one or more via contacts. In some embodiments, the integrated circuit includes a third layer above the second layer along the second direction. In some embodiments, the third layer includes a second metal rail electrically coupled to one or more of the set of power switches through one or more additional via contacts.

In some embodiments, the first layer further includes a third metal rail separated from the first metal rail by a distance along the first direction. In some embodiments, the second layer further includes another active region separated from the contiguous region of the active regions of the set of power switches. In some embodiments, the third metal rail is electrically coupled to the another active region through a via contact. In some embodiments, a length of the contiguous region of the active regions for the set of power switches along the first direction is at least four times the distance. In some embodiments, the length of the contiguous region of the active regions for the set of power switches is at least $1.1 \times M \times N$ and less than or equal to $1.4 \times M \times N$, where the M is a number of power switches of the set of power switches and the N is larger than four times the distance.

One aspect of this description relates to an integrated circuit. In some embodiments, the integrated circuit includes a first layer including a first metal rail and a second metal rail separated by a distance along a first direction. In some embodiments, the integrated circuit includes a second layer above the first layer along a second direction perpendicular to the first direction. In some embodiments, the second layer includes a first active region of one or more first transistors and a second active region of one or more second transistors. In some embodiments, the first metal rail is electrically coupled to the first active region through a first via contact. In some embodiments, the second metal rail is electrically coupled to the second active region through a second via contact. In some embodiments, the first active region has a length along the first direction larger than four times the distance. In some embodiments, the integrated circuit includes a third layer above the second layer along the second direction. In some embodiments, the third layer includes a third metal rail electrically coupled to the first active region through a third via contact.

One aspect of this description relates to a method for forming an integrated circuit. In some embodiments, the method includes forming a first layer including a first metal rail and a second metal rail separated by a distance along a first direction. In some embodiments, the method includes forming a second layer above the first layer along a second direction perpendicular to the first direction. In some embodiments, the second layer includes active regions for a set of power switches and another active region. In some embodiments, the active regions of the set of power switches are connected to form a contiguous region extending in the first direction. In some embodiments, the first metal rail is electrically coupled to one or more of the active regions through one or more via contacts. In some embodiments, the second metal rail is electrically coupled to another active region through one or more via contacts. In some embodiments, a length of the contiguous region of the active regions for the set of power switches along the first direction is at least four times the distance. In some embodiments, the method includes forming a third layer above the second layer along the second direction. In some embodiments, the third layer includes a third metal rail electrically coupled to one or more of the active regions of the set of power switches through one or more via contacts. In some embodiments, the length of the contiguous region of the active regions for the set of power switches is at least 1.1×M×N and less than or equal to 1.4×M×N, where the M is a number of power switches of the set of power switches and the N is larger than four times the distance.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   forming a first layer including a first backside metal rail extending in a first direction;
   forming a second layer above the first layer along a second direction perpendicular to the first direction, wherein the second layer includes a first contiguous region configured for forming a set of power switches and extending in the first direction, wherein the first backside metal rail is electrically coupled to the first contiguous region through one or more first via contacts; and
   forming a third layer further above the second layer along the second direction, wherein the third layer includes a first front side metal rail electrically coupled to one or more of the set of power switches through one or more second via contacts.

2. The method of claim 1, further comprising:
   forming a second backside metal rail in the first layer, wherein the second backside metal rail is separated from the first metal rail by a distance along the first direction.

3. The method of claim 2, wherein a length of the first contiguous region of the second layer is at least 1.1×M×N and less than or equal to 1.4×M×N, where the M is a number of the set of power switches, wherein the M is larger than one, and wherein the N is larger than four times the distance.

4. The method of claim 2, further comprising:
   forming a second contiguous region in the second layer;
   wherein the second backside metal rail is electrically coupled to the second contiguous region through one or more third via contacts.

5. The method of claim 1, further comprising:
   forming a fourth layer, the first layer above the fourth layer along the second direction, wherein the fourth layer includes a plurality of third backside metal rails extending in a third direction orthogonal to the first direction and the second direction, wherein at least one of the plurality of third backside metal rails is electrically coupled to the first backside metal rail through one or more fourth via contacts.

6. The method of claim 5, wherein the at least one of the plurality of third backside metal rails provides a supply voltage to at least one of the set of power switches through the first backside metal rail.

7. The method of claim 6, further comprising:
   forming a fifth layer above the third layer along the second direction, wherein the fifth layer includes a second front side metal rail electrically coupled to the first front side metal rail through one or more fifth via contacts, wherein a regulated voltage of the supply voltage is provided from the at least one of the set of power switches to the second front side metal rail through the first front side metal rail.

8. The method of claim 1, wherein the first contiguous region is configured to form at least source regions or drain regions of respective transistors of the set of power switches.

9. A method, comprising:
   forming a first layer including a first backside metal rail and a second backside metal rail each extending in a first direction, wherein the first and second backside metal rails are separated from each other in the first direction with a distance;
   forming a second layer above the first layer along a second direction perpendicular to the first direction, wherein the second layer includes a first contiguous region configured for forming a set of power switches and extending in the first direction, wherein the first backside metal rail is electrically coupled to the first contiguous region through one or more first via contacts; and
   forming a third layer further above the second layer along the second direction, wherein the third layer includes a first front side metal rail electrically coupled to one or more of the set of power switches through one or more second via contacts.

10. The method of claim 9, wherein a length of the first contiguous region of the second layer is at least 1.1×M×N, where the M is a number of the set of power switches, wherein the M is larger than one, and wherein the N is larger than four times the distance.

11. The method of claim 9, wherein a length of the first contiguous region of the second layer is less than or equal to 1.4×M×N, where the M is a number of the set of power switches, wherein the M is larger than one, and wherein the N is larger than four times the distance.

12. The method of claim 9, further comprising:
    forming a second contiguous region in the second layer;
    wherein the second backside metal rail is electrically coupled to the second contiguous region through one or more third via contacts.

13. The method of claim 9, further comprising:
    forming a fourth layer, the first layer above the fourth layer along the second direction, wherein the fourth layer includes a plurality of third backside metal rails extending in a third direction orthogonal to the first direction and the second direction, wherein at least one of the plurality of third backside metal rails is electrically coupled to the first backside metal rail through one or more fourth via contacts.

14. The method of claim 13, wherein the at least one of the plurality of third backside metal rails provides a supply voltage to at least one of the set of power switches through the first backside metal rail.

15. The method of claim 14, further comprising:
forming a fifth layer above the third layer along the second direction, wherein the fifth layer includes a second front side metal rail electrically coupled to the first front side metal rail through one or more fifth via contacts, wherein a regulated voltage of the supply voltage is provided from the at least one of the set of power switches to the second front side metal rail through the first front side metal rail.

16. The method of claim 9, wherein the first contiguous region is configured to form at least source regions or drain regions of respective transistors of the set of power switches.

17. A method, comprising:
forming a first layer including a first backside metal rail and a second backside metal rail each extending in a first direction, wherein the first and second backside metal rails are separated from each other in the first direction with a distance;
forming a second layer above the first layer along a second direction perpendicular to the first direction, wherein the second layer includes a first contiguous region configured for forming a set of power switches and extending in the first direction, wherein the first backside metal rail is electrically coupled to the first contiguous region through one or more first via contacts; and
forming a third layer further above the second layer along the second direction, wherein the third layer includes a first front side metal rail electrically coupled to one or more of the set of power switches through one or more second via contacts;
wherein a length of the first contiguous region of the second layer is at least $1.1 \times M \times N$ and less than or equal to $1.4 \times M \times N$, where the M is a number of the set of power switches, wherein the M is larger than one, and wherein the N is larger than four times the distance.

18. The method of claim 17, further comprising:
forming a second contiguous region in the second layer;
wherein the second backside metal rail is electrically coupled to the second contiguous region through one or more third via contacts.

19. The method of claim 17, further comprising:
forming a fourth layer, the first layer above the fourth layer along the second direction, wherein the fourth layer includes a plurality of third backside metal rails extending in a third direction orthogonal to the first direction and the second direction, wherein at least one of the plurality of third backside metal rails is electrically coupled to the first backside metal rail through one or more fourth via contacts.

20. The method of claim 17, wherein the at least one of the plurality of third backside metal rails provides a supply voltage to at least one of the set of power switches through the first backside metal rail.

* * * * *